United States Patent Office 3,238,999
Patented Mar. 8, 1966

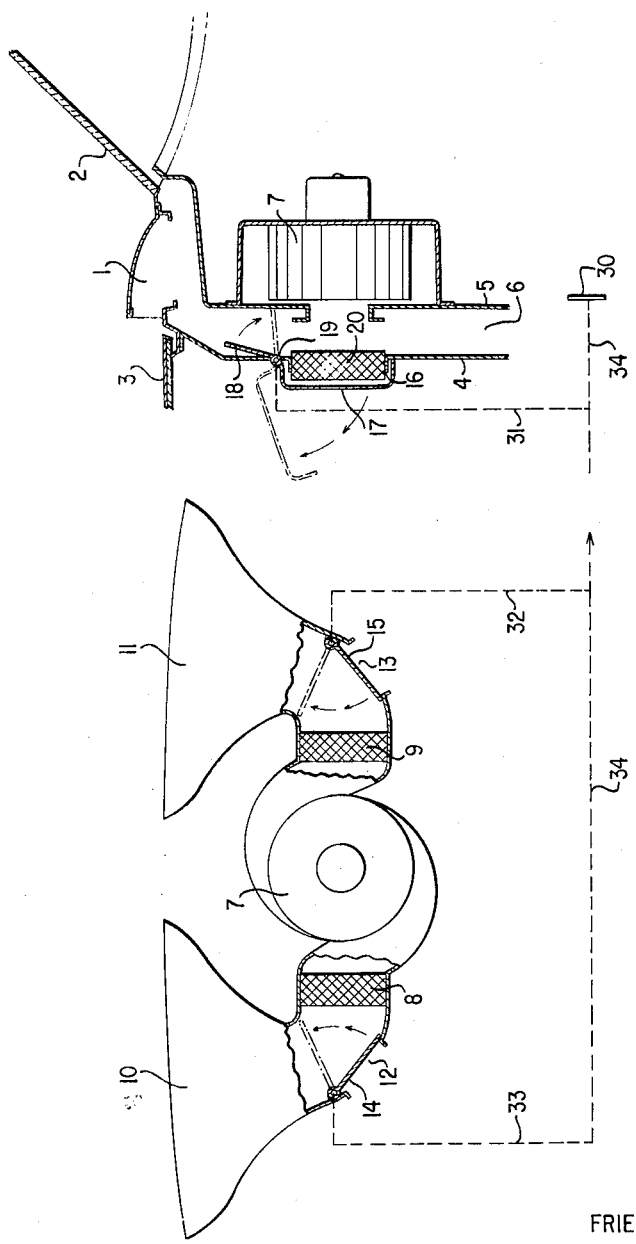

3,238,999
VENTILATING INSTALLATION FOR VEHICLES
Friedrich K. H. Nallinger, Stuttgart, Germany, assignor to Daimler-Benz Aktiengesellschaft, Stuttgart-Unterturkheim, Germany
Filed May 15, 1961, Ser. No. 110,221
Claims priority, application Germany, May 19, 1960, D 33,377
6 Claims. (Cl. 165—41)

The present invention relates to a ventilating and air-conditioning or heating installation for vehicles, especially for motor vehicles having fresh-air intake suction means, heat exchanger means for heating the sucked-in air and defroster nozzle means for blowing or discharging warm air against the windshield pane or other window panes.

With extremely unfavorable weather conditions, for example, during blizzards, a very high output of the defrosting installation is required in order to keep the windshield pane free or clear of snow or ice. Most of the known installations are not equipped to handle, i.e., do not come up to these extreme requirements so that the windshield pane has to be cleaned repeatedly by hand. Responsible for such inadequacy is in part the circumstance that the air inlet apertures of the known, prior art ventilation and heating installations are snowed in, i.e. are likely to be covered up with snow during blizzards so that the output of the installation is reduced exactly at the time when extremely high outputs are required therefrom.

The present invention is based on the problem to effectively avoid and eliminate the aforementioned disadvantages and to create a ventilating and heating installation which, notwithstanding the most simple construction thereof, is capable to produce extremely large defrosting outputs and therebeyond offers the possibility to shift the installation, with a single manipulation, to the maximum defrosting output thereof.

The present invention essentially consists in providing the ventilating and air-conditioning installation with an additional auxiliary connection leading to the engine space which is adapted to be closed by means of a valve, flap or the like. It is thereby of particular advantage if, during opening of the connection to the engine space, simultaneously therewith the fresh-air supply is interrupted by means of a valve, flap or the like adapted to be selectively closed. There is achieved as a result thereof an installation in which, on the one hand, independently of the condition of the air inlet aperture, a sufficient quantity of air can be drawn-in or sucked-in out of the engine space, and on the other, a mixing of the air drawn in from the engine space with the very cold fresh air is avoided. This is particularly appropriate if, according to a further feature of the present invention, an additional heat exchanger is provided which serves for purposes of preheating the air sucked-in out of the engine space. The output of the installation may be considerably increased as a result thereof.

With a ventilation and air-conditioning installation provided with valves, flaps, or the like for selectively distributing the heated air to the defroster nozzles and to the floor space of the vehicle interior or passenger space, according to a further feature of the present invention, all or almost all of the air is to be conducted to the defroster nozzles upon opening of the connection to the engine space by selectively adjusting or shifting the distributor valves to the corresponding positions thereof. In order to enable shifting of the installation with a single manipulation to the position of maximum defrosting output thereof, it is appropriate if the valve, flap or the like within the fresh-air line and/or the distributor valves, flaps or the like are operatively connected with the valve, flap or the like in the connection leading to the engine space and are adapted to be selectively adjusted by a single manipulation of a handle, knob, adjusting lever or the like upon opening of the connection leading to the engine space. For that purpose, the valve or flap to the engine space and the valve or flap in the fresh air line may be constructed as a one-piece or unitary double-valve or double-flap assembly.

Accordingly, it is an object of the present invention to provide a ventilating and air-conditioning installation for vehicles, especially motor vehicles provided with defroster nozzles which effectively eliminates the shortcomings and disadvantages of the prior art constructions.

It is another object of the present invention to provide a ventilating and heating installation for vehicles which is extremely simple in construction, yet provides an extremely large output in case of high defrosting requirements, for example, during blizzards.

Still another object of the present invention resides in the provision of a heating and ventilating installation for motor vehicles provided with defroster nozzle means for the windshield and/or other window panes of the vehicle which is capable of an extremely high defrosting output to thereby assure sufficient defrosting of the windshield and/or window panes under all weather conditions.

Still a further object of the present invention resides in the provision of a heating and ventilating installation for vehicles adapted to produce an extremely high defrosting output which is not only simple in its construction but easy to adjust and manipulate, and also permits by means of a single manipulation to adjust the installation to maximum defrosting output thereof.

These and other objects, features and advantages of the present invention will become more obvious from the following description when taken in connection with the accompanying drawing which shows, for purposes of illustration only, one embodiment in accordance with the present invention, and wherein FIGURE 1 is a partial schematic cross sectional view through a ventilating and heating installation in accordance with the present invention, and FIGURE 2 is a front elevational view, partly in cross section, of the ventilating and heating installation of FIGURE 1.

Referring now to the drawing wherein like reference numerals are used throughout the two views to designate corresponding parts, and more particularly to FIGURE 1, fresh air, during normal operation, enters through the inlet aperture 1 which is arranged, in a manner known per se, ahead of the windshield pane 2 and behind the engine hood 3 of a passenger motor vehicle, into the channel 6 formed by the walls 4 and 5. The channel 6 of which only a portion is shown may be constructed in any suitable manner. The fresh air is drawn-in or sucked-in by means of the radial blower 7, and is conducted from or supplied by blower 7, as shown in FIGURE 2, to the heat exchangers 8 and 9, supplied with a suitable heating medium in any known conventional manner. Any appropriate control system including temperature regulating means may be used in the circulatory system for the heat exchangers 8 and 9. After passage through heat exchangers 8 and 9, the fresh air which has now been heated, either reaches the defroster nozzles 10 and 11 terminating below the windshield pane and/or through the apertures 12 and 13 to the floor space of the vehicle interior or passenger space. The distribution of the heated air to the defroster nozzles 10 and 11 and to the floor space may be selectively adjusted by means of distributor valves 14 and 15 of any suitable construction. These distributor valves 14 and 15 are so arranged that the apertures 12 and 13 and the channels leading to the defroster nozzles 10 and 11 may be completely or partly closed thereby. Consequently, intermediate positions for the valves 12 and 13 are also possible so that a part of the heated air is conducted to the defroster nozzle and the remainder to the floor space of the vehicle.

A further aperture 16 is provided in the forward wall 4 of the channel 6 which is normally closed by means of a flap 17. By opening flap 17, the ventilating and heating installation of the present invention is brought into communication through aperture 16 with the engine space disposed in front thereof so that air can now be sucked-in in the direction from the engine space. The valve or flap 17 is operatively connected, for example, by a rigid connection of any suitable construction, with a valve or flap 18 which is pivoted together with the valve or flap 17 for adjustment thereof and which during opening of the valve or flap 17 closes the connection to the air inlet aperture 1 whereby the fresh air supply is interrupted. This position of valves or flaps 17 and 18 is indicated in dash line in FIGURE 1.

The valves or flaps 17 and 18 are constructed in the illustrated embodiment as a double-valve or double-flap assembly which is pivotally mounted at the front wall 4 about the shaft or pin 19. For purposes of establishing the connection of the ventilating and heating installation with the engine space, this double-valve or double-flap 17, 18 is shifted into the position thereof illustrated in dash line in FIGURE 1. Simultaneously with the adjustment of the double-valve 17, 18, it is also desirable in the illustrated embodiment to positively adjust the distributor valves 14 and 15 by means of a handle or the like adapted to be manipulated from the vehicle interior space so that all or nearly all the air is conducted or supplied to the windshield pane 2 through the defroster nozzles 10 and 11. Such single-actuation control may be of any known, prior art construction and is illustrated herein only schematically by handle or lever 30 operatively, for instance, mechanically connected with valves 14 and 15 and with double-valve 17, 18 by means of linkages 34, 33, 32 and 31.

A further heat exchanger 20 is installed in the aperture 16 of the forward wall 4 whereby hot water flows at all times through the further heat exchanger 20. It is possible by the use of such an arrangement to preheat already in the auxiliary heat exchanger 20 the air sucked-in from the engine space for maximum defrosting action before it enters the ventilating and air-conditoned installation properly speaking provided with the usual heater consisting of heat exchangers 8 and 9. As a result thereof, a sufficient quantity of very warm air is always available independently of the weather conditions so that also with extremely unfavorable weather conditions a safe defrosting of the windshield pane and/or possibly also of other panes is achieved.

While I have shown and described one embodiment in accordance with the present invention, it is understood that the same is not limited thereto, but is susceptible of many changes and modifications within the spirit and the scope of the present invention; for example, heat exchangers 8 and 9 may serve selectively for heating or cooling the air admitted through intake 7. Additionally, any number of branch lines and/or parallel systems may be provided, connected with the duct 6 to produce any known ventilating and air-conditioning or heating system. Consequently, I do not wish to be limited to the details shown and described herein but intend to cover all such changes and modifications as are encompassed by the scope of the appended claims.

I claim:

1. A ventilating and heating installation for vehicles, especially motor vehicles provided with engine space means, passenger space means separated from said engine space means and windowpane means, comprising defroster nozzle means located adjacent the interior surface of said windowpane means, cowl means adjacent the exterior surface of said windshield means on said vehicle, and means operatively connecting said cowl means with said defroster nozzle means including a conduit system provided with a fresh air conduit connected at one end to said cowl means, blower means within said conduit system connected to the other end of said conduit for drawing air from outside said vehicle through said cowl means, heat-exchanger means within said conduit system, distributor valve means for selectively valving the air flow to said defroster nozzle means and to the floor space of said passenger space means, said conduit containing an aperture providing a communication between said conduit and said engine space means to supply heated air from said engine space means to said conduit system, first valve means operative to selectively open and close said aperture, second valve means for selectively closing and opening said conduit, and the control means operatively connected with said first valve means and with at least one of said distributor valve and second valve means for selectively adjusting the same in unison during opening of said aperture to conduct at least nearly all of the air to said defroster nozzle means.

2. A ventilating and heating installation for vehicles, especially motor vehicles provided with engine space means, passenger space means separated from said engine space means and windowpane means, comprising defroster nozzle means located adjacent the interior surface of said windowpane means, cowl means mounted on an exterior surface of said vehicle, and means operatively connecting said cowl means with said defroster nozzle means including a conduit system including a conduit connected at one end to said cowl means, blower means within said conduit system for drawing outside air through said cowl means, heat-exchanger means within said conduit system, distributor valve means for selectively valving the air flow to said defroster nozzle means and to the floor space of said passenger space means, said conduit containing an aperture providing a communication between said conduit and said engine space means to supply air from said engine space means to said conduit system, first valve means operative to selectively open and close said aperture, and second valve means operatively to selectively close and open the communication to said cowl means, said first and second valve means being constructed as a unitary double-valve assembly.

3. A ventilating and heating installation for vehicles, especially motor vehicles provided with engine space means, passenger space means separated from said engine space means and windowpane means, comprising defroster nozzle means located adjacent the interior surface of said windowpane means, cowl means mounted on an exterior surface of said vehicle, and means operatively connecting said cowl means with said defroster nozzle means including a conduit system including a conduit connected at one end to said cowl means, blower means within said conduit system for drawing outside air through said cowl means, heat-exchanger means within said conduit system, distributor valve means for selectively valving the air flow to said defroster nozzle means and to said passenger space means, said conduit containing an aperture providing a communication between said conduit and said engine space means to supply hot air from said engine space means to said conduit system, first valve means operative to selectively open and close said aperture, second valve means operative to selectively close and open the portion of said conduit system leading to said cowl means, and control means operatively connected with said first valve means and with said second valve means and said distributor valve means for selectively and substantially simultaneously adjusting said valve means to conduct at least nearly all of the air flowing through said conduit system to said defroster nozzle means upon opening of said aperture by said first valve means and closing of said second valve means.

4. A ventilating and heating installation for vehicles, especially motor vehicles provided with engine space means, passenger space means separated from said engine space means and windowpane means, comprising defroster nozzle means located adjacent the interior surface of said windowpane means, cowl means mounted on an exterior surface of said vehicle, and means operatively connecting said cowl means with said defroster nozzle means including a conduit system including a conduit connected at one end to said cowl means, blower means within said conduit system for drawing outside air through said cowl means, heat-exchanger means within said conduit system, distributor valve means for selectively valving the air flow to said defroster nozzle means and to said passenger space means, said conduit containing an aperture providing a communication between said conduit and said engine space means to supply air from said engine space means to said conduit system, valve means operative to selectively open and close said aperture to said engine space, and control means operatively connected with said first valve means and said second valve means for selectively adjusting said valve means to conduct at least nearly all of the air flowing through said conduit system to said defroster nozzle means upon opening of said aperture by said valve means and closing of said second valve means.

5. A ventilating and heating installation for vehicles, especially motor vehicles provided with engine space means, passenger space means separated from said engine space means, and windowpane means, comprising defroster nozzle means located adjacent the interior surface of said windowpane means, fresh air inlet means mounted on an exterior surface of said vehicle, and means operatively connecting said fresh air inlet means with said defroster nozzle means including a conduit system including a conduit connected at one end to said fresh air inlet means, blower means within said conduit system for drawing outside air through said conduit, heat-exchanger means within said conduit system, distributor valve means for selectively valving the air flow to said defroster nozzle means and to said passenger space means, said conduit containing an aperture providing a communication between said conduit and said engine space means to supply heated air from said engine space means to said conduit system, valve means operative to selectively open and close said aperture, and control means operatively connected with said valve means and said distributor valve means for selectively adjusting said distributor valve means to conduct at least nearly all of the air flowing through said conduit system to said defroster nozzle means upon opening of said aperture by said valve means.

6. A ventilating and heating installation for vehicles, especially motor vehicles provided with engine space means, passenger space means separated from said engine space means and windowpane means, comprising defroster nozzle means located adjacent the interior surface of said windowpane means, fresh-air inlet means mounted on an exterior surface of said vehicle, and means operatively connecting said fresh-air inlet means with said defroster nozzle means including a conduit system including a conduit connected at one end to said fresh-air inlet means, blower means within said conduit system for drawing outside air through said conduit, heat-exchanger means within said conduit system, distributor valve means for selectively valving the air flow to said defroster nozzle means and to said passenger space means, said conduit containing an aperture providing a communication between said conduit and said engine space means to supply air from said engine space means to said conduit system including auxiliary heat-exchanger means mounted in said aperture for preheating the air drawn in from said engine space means, further valve means operative to selectively open and close said aperture while simultaneously therewith closing and opening the communication to said fresh-air inlet means, respectively, and control means operatively connected with said distributor valve means and said further valve means for selectively adjusting said distributor valve means to conduct at least nearly all of the air flowing through said conduit system to said defroster nozzle means upon opening of said aperture by said further valve means.

References Cited by the Examiner
UNITED STATES PATENTS

| 2,016,019 | 10/1935 | Muvrin | 98—2.6 |
| 2,242,337 | 5/1941 | Aufiero | 257—137.8 |
| 3,003,320 | 10/1961 | Obermaier | 257—277 |

ROBERT A. O'LEARY, *Primary Examiner.*

HERBERT L. MARTIN, CHARLES SUKALO,
*Examiners.*